US009697474B2

(12) United States Patent
Liu et al.

(10) Patent No.: US 9,697,474 B2
(45) Date of Patent: Jul. 4, 2017

(54) CLASSIFICATION SYSTEM

(71) Applicant: Google Inc., Mountain View, CA (US)

(72) Inventors: Yifang Liu, Redwood City, CA (US); Konstantinos Katsiapis, Palo Alto, CA (US); Samuel Ieong, Mountain View, CA (US); Roberto Bayardo, San Jose, CA (US)

(73) Assignee: Google Inc., Mountain View, CA (US)

( * ) Notice: Subject to any disclaimer, the term of this patent is extended or adjusted under 35 U.S.C. 154(b) by 445 days.

(21) Appl. No.: 14/096,050

(22) Filed: Dec. 4, 2013

(65) Prior Publication Data

US 2015/0154507 A1 Jun. 4, 2015

(51) Int. Cl.
*G06F 17/00* (2006.01)
*G06N 5/04* (2006.01)
*G06N 99/00* (2010.01)

(52) U.S. Cl.
CPC .................. *G06N 99/005* (2013.01)

(58) Field of Classification Search
CPC ....... G06K 9/623; G06Q 50/20; G06Q 50/205
USPC .......................................................... 706/60
See application file for complete search history.

(56) References Cited

U.S. PATENT DOCUMENTS

| | | | | |
|---|---|---|---|---|
| 8,069,182 B2* | 11/2011 | Pieper | ................. | G06F 17/3089 707/769 |
| 8,209,616 B2* | 6/2012 | Stefik | ................. | G06F 17/3089 707/708 |
| 8,280,882 B2* | 10/2012 | Troy | ................... | G06F 17/3069 707/723 |
| 2002/0169770 A1* | 11/2002 | Kim | ..................... | G06F 17/3071 |
| 2003/0130994 A1* | 7/2003 | Singh | ................ | G06F 17/30867 |
| 2008/0101689 A1* | 5/2008 | Forman | .................. | G06K 9/623 382/159 |
| 2008/0147574 A1* | 6/2008 | Chidlovskii | ......... | G06N 99/005 706/12 |
| 2010/0070339 A1* | 3/2010 | Bae | ........................ | G06Q 30/02 705/7.11 |
| 2011/0040706 A1* | 2/2011 | Sen | ....................... | G06N 99/005 706/12 |

(Continued)

OTHER PUBLICATIONS

'An introduction to programming and problem solving with pascal': Schneider, 1982, John Wiley & Sons.*

(Continued)

*Primary Examiner* — Stanley K Hill
*Assistant Examiner* — Peter Coughlan
(74) *Attorney, Agent, or Firm* — Fish & Richardson P.C.

(57) ABSTRACT

Multi-class classification by training a machine learning system based on training inputs each of which includes features and at least one class label. Each training input is assigned a membership value that can indicate if an entity having the features of the training input is a member of the class corresponding to the class label that is also included in the training input. To determine if an entity having test features is a member of several test classes, test inputs can be constructed where each input includes the test features and a class label corresponding to one of the test classes. The test inputs are processed by the trained machine learning system, which produces as outputs test membership values that represent the likelihood that the entity having the features in the test input belong to the test class corresponding to the test class label also included in the test input.

20 Claims, 3 Drawing Sheets

(56) References Cited

U.S. PATENT DOCUMENTS

| | | | | |
|---|---|---|---|---|
| 2012/0033581 A1* | 2/2012 | Torres Ramon | ........ | H04L 12/14 370/253 |
| 2013/0042007 A1* | 2/2013 | Linton | ................... | G06Q 10/10 709/226 |
| 2013/0212059 A1* | 8/2013 | Ameri-Yahia | .... | G06F 17/30713 706/52 |
| 2013/0304739 A1* | 11/2013 | Martineau | ......... | G06F 17/30707 707/737 |

OTHER PUBLICATIONS

'Google Pocket Guide': Calishain, O'Reilly, 2003.*
'Support Vector Machines and other kernal based learning methods': Cristianini, Canbridge university press, 2005.*
Elements of Artificial Neural Networks: Mehrotra, MIT press, 1997.*
Campbell and Cristianini, "Simple Learning Algorithms for Training Support Vector Machines," Technical Report, University of Bristol, UK, 1999, 29 pages.
Batista et al., "A Study of the Behavior of Several Methods for Balancing Machine Learning Training Data," ACM SIGKDD Explorations Newsletter—Special issue on learning from imbalanced datasets, 6(1):20-29, Jun. 2004.
Saerens, "Non Mean Square Error Criteria for the Training of Learning Machines," in Proc. 13th Int. Conf. Machine Learning, 1996, 427-434.
Nguyen and Armitage, "Training on multiple sub-flows to optimise the use of Machine Learning classifiers in real-world IP networks," Proceedings 2006 31st IEEE Conference on Local Computer Networks, Nov. 14-16, 2006, 369-376.
Cho et al., "Enhanced Gradient and Adaptive Learning Rate for Training Restricted Boltzmann Machines," Proceedings of the 28$^{th}$ International Conference on Machine Learning, 2011, 105-112.

* cited by examiner

CLASSIFICATION SYSTEM

BACKGROUND

Multi-class classifiers take the approaches of one-versus-all or all-versus-all or their variations, which train multiple models for multiple classes and pick a winning class according to the inference results from the multiple models for a classification instance. The requirement for multiple models can make these approaches more complex to implement than binary classification algorithms.

BRIEF SUMMARY

According to an implementation of the disclosed subject matter, a plurality of training inputs can be received. Each training input can include at least one training feature and at least one training class label that can identify a training class. Training outputs can be received, where each training output corresponds to a training input. Each training output can include a training membership value that can indicate the membership status of an entity corresponding to the training input with respect to the training class. The training membership value can be binary value or any other kind of number. A machine learning system can be trained based on the training inputs and the training outputs, producing a trained machine learning system.

An implementation can receive at least one test feature and generate several test inputs. Each test input can include at least one test feature and a class label that identifies a test class. For each test input, a test membership value can be determined based on the trained machine learning system. The test membership value can indicate a likelihood that an entity corresponding to the one or more test features is a member of a class corresponding to the class label included in the test input along with the one or more features.

An implementation can receive a threshold value and determining that a test membership value meets the threshold value. Based upon that determination, the implementation can determine that the test membership status is positive, i.e., that the entity corresponding to the membership value belongs to the class whose class label is provided as a part of the test input that the machine learning system used to produce the test membership value.

An implementation can receive a priority value. The implementation can identify the N highest test membership values among a set of outputs, where N is based on the priority value. The implementation can identify the class labels corresponding to the identified N highest test membership values. The implementation can determine that the membership status is positive for each entity corresponding to the identified class labels.

An implementation can generate a confidence metric based on the N highest membership values. The confidence metric can be based on a weighted or unweighted average of at least some of the N highest membership values.

An implementation can include a processor configured to receive a plurality of training inputs. Each training input can include at least one training feature and at least one training class label that can identify a training class. The processor can receive training outputs, where each training output corresponds to a training input. Each training output can include a training membership value that can indicate the membership status of an entity corresponding to the training input with respect to the training class. The training membership value can be binary value or any other kind of number. A machine learning system can be trained based on the training inputs and the training outputs, producing a trained machine learning system.

An implementation can include a processor that can receive at least one test feature and generate several test inputs. Each test input can include at least one test feature and a class label that identifies a test class. For each test input, the processor can determine a test membership value based on the trained machine learning system. The test membership value can indicate a likelihood that an entity corresponding to the one or more test features is a member of a class corresponding to the class label included in the test input along with the one or more features.

An implementation can include a processor that can receive a threshold value and determine that a test membership value meets the threshold value. Based upon that determination, the processor can determine that the test membership status is positive, i.e., that the entity corresponding to the membership value belongs to the class whose class label is provided as a part of the test input that the machine learning system used to produce the test membership value.

An processor in an implementation can receive a priority value. The processor can identify the N highest test membership values among a set of outputs, where N is based on the priority value. The processor can identify the class labels corresponding to the identified N highest test membership values. The processor can determine that the membership status is positive for each entity corresponding to the identified class labels.

An implementation can include a processor configured to generate a confidence metric based on the N highest membership values. The confidence metric can be based on a weighted or unweighted average of at least some of the N highest membership values.

Systems and techniques disclosed herein may allow for systems and method to implement multi-class classification systems that can determine if an entity belongs to a set of classes based on one or more features that are used to describe the entity. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

An implementation of the disclosed subject matter can include a multi-class classification system that can determine if an event or object ("entity") belongs to a set of classes based on the features that can describe the entity. An event can be an occurrence of any kind. An object can be a piece of data, such as a news article or identifier, a person, such as a user, etc. A set of training inputs (examples) can be used to train a machine learning system. In an implementation of the disclosed subject matter, an input can include one or more features and a class label. A class label can correspond to one or more attributes that are shared by members of a class. Each input can have a membership value that can indicate the membership status of the entity described by the features in the class denoted by the class label, which is included in the input. For example,

| Input: Features and Class Label | Membership Value |
|---|---|
| $(f_1, f_2, \ldots, f_n, C_i)$ | $\begin{cases} 0, & \text{not a member of } C_i \\ 1, & \text{is a member of } C_i \end{cases}$ |

Figure 3:
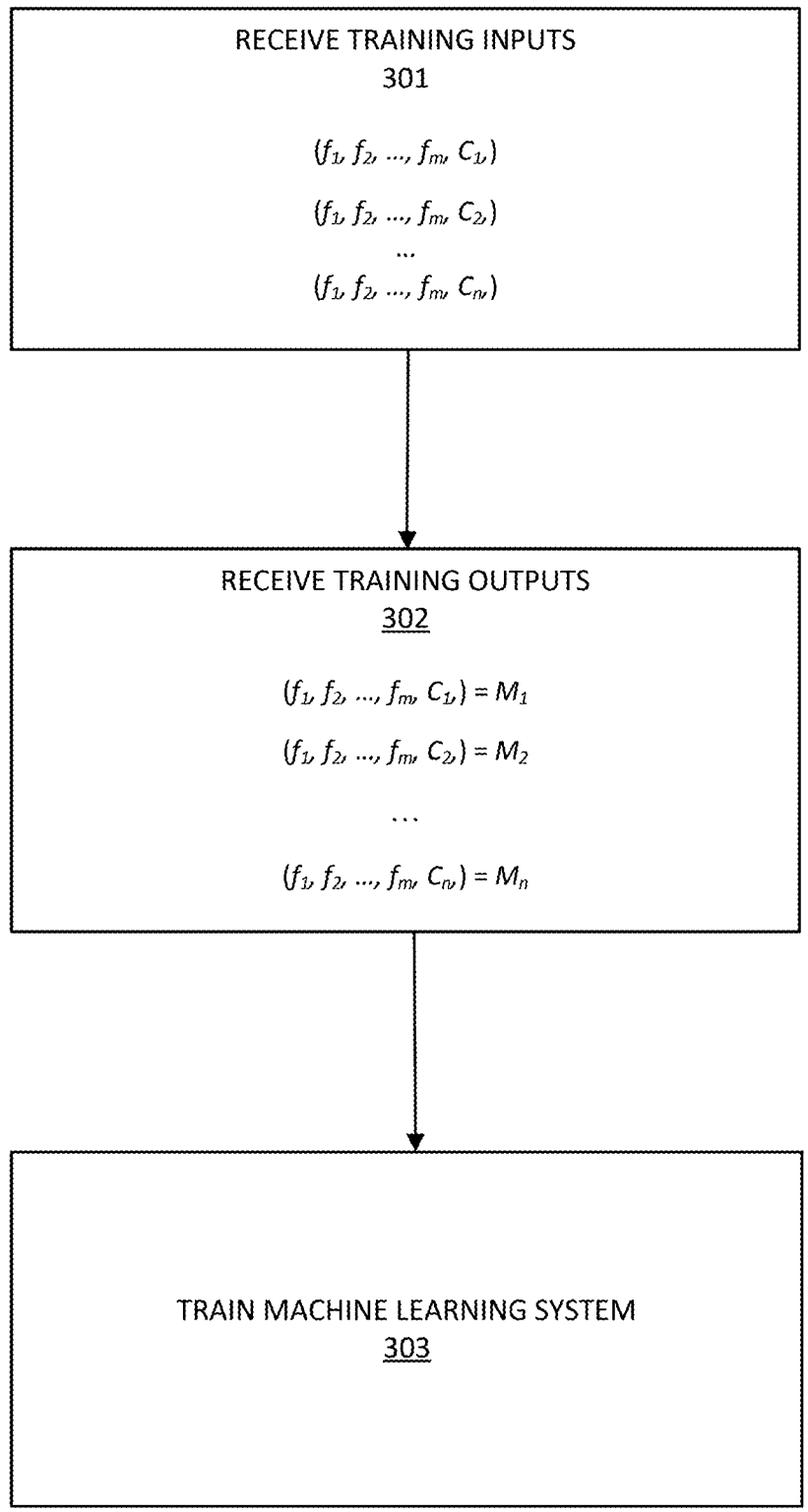
FIG. 3 shows an example of training a machine learning system according to an implementation of the disclosed subject matter.

As show in FIG. 3 (301), training inputs may be of the form:

$$(f_1, f_2, \ldots, f_m, C_1)$$
$$(f_1, f_2, \ldots, f_m, C_2)$$
$$\vdots$$
$$(f_1, f_2, \ldots, f_m, C_n),$$

and be matched with known outputs (302):

$$(f_1, f_2, \ldots, f_m, C_1) = M_1$$
$$(f_1, f_2, \ldots, f_m, C_2) = M_2$$
$$\vdots$$
$$(f_1, f_2, \ldots, f_m, C_n) = M_n,$$

where the membership status of features $(f_1, f_2, \ldots, f_m)$ in each class $C_i$ is known and is indicated by the corresponding training membership value $M_i$. A machine learning system can be trained using the training inputs and training outputs. A machine learning system can include any is automated system that can optimize a performance criterion using training data or past experience. Examples of machine learning systems can include neural networks, support vector machines, Bayes networks, etc.

For example, an entity can be a news article and the problem may be to find a set of classes that describe which topics are covered by the news article. A number of news articles may be analyzed based upon a template such as a type of feature. A template can describe an attribute of an entity and a feature can be a particular value. The value can be a binary value, a real number, a string or in any other suitable form. For example:

| Template | Feature |
|---|---|
| $F_1$ = publisher | $f_1$ = Washington Post |
| $F_2$ = author | $f_2$ = Greenwood |
| $F_3$ = longest word in title | $f_3$ = firestorm |
| $F_4$ = second longest word in title | $f_4$ = political |
| $F_5$ = third longest word in title | $f_5$ = critic |

An example of class labels can include:
$C_1$=sports
$C_2$=crime
$C_3$=weather
$C_4$=food
$C_5$=entertainment
$C_6$=business For example, a set of training inputs may include the following features and class labels as inputs and their corresponding training membership values:

(New York Times, Greenberg, financial, quarter, frost, business)=1
(New York Times, Greenberg, financial, quarter, frost, entertainment)=0
(New York Times, Greenberg, financial, quarter, frost, food)=1
(New York Times, Greenberg, financial, quarter, frost, weather)=1
(New York Times, Greenberg, financial, quarter, frost, sports)=0
(New York Times, Greenberg, financial, quarter, frost, technology)=0

This training set indicates the membership status of an entity described by the above features across several classes. Thus, the entity (an article) belongs to the classes (pertain to the topics) "business", "food" and "weather", and are not members of the classes (does not relate to) "entertainment", "sports" and "technology."

Another example of a set of training inputs can be:
(Time, Wilson, Hollywood, Christmas, releases, entertainment)=0
(LA Times, Caldwell, pressure, zone, high, weather)=1
(Forbes, James, manipulate, interest, libor, business)=0
(Wall Street Journal, Gavin, Calif., cabernet, napa, food)=0
(CNN, Derwin, Froome, France, Tour, sport)=1

Figure 4:
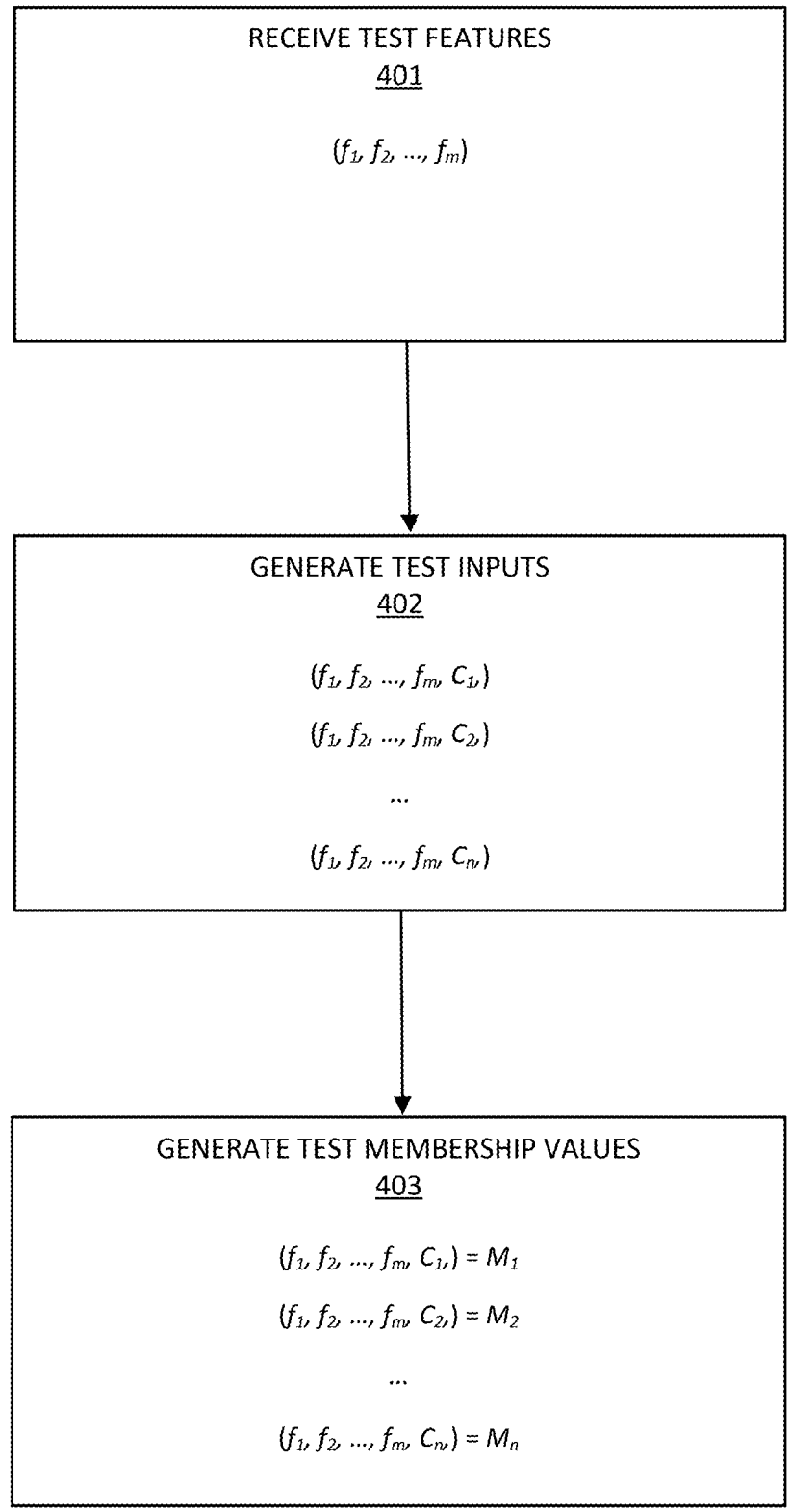
FIG. 4 shows an example of multiclass classification using a trained machine learning system according to an implementation of the disclosed subject matter.

Once trained, a test input can be provided to the machine learning system. In an implementation, a set of test inputs can be constructed to obtain predictions from the machine learning system as to whether an entity having certain test features is a member of certain classes. In other words, as shown in FIG. 4, an implementation can receive features $(f_1, f_2, f_3, f_4)$ that correspond to an entity (401). The entity can be tested for membership in classes $\{C_1, C_2, C_3, C_4, C_5\}$ by generating the test inputs (402):

$(f_1, f_2, f_3, f_4, C_1)$
$(f_1, f_2, f_3, f_4, C_2)$
$(f_1, f_2, f_3, f_4, C_3)$
$(f_1, f_2, f_3, f_4, C_4)$
$(f_1, f_2, f_3, f_4, C_5)$

These inputs can be provided to the machine learning system, which can provide test membership value outputs $\{M_1, M_2, M_3, M_4, M_5\}$ (403):

$(f_1, f_2, f_3, f_4, C_1) = M_1$
$(f_1, f_2, f_3, f_4, C_2) = M_2$
$(f_1, f_2, f_3, f_4, C_3) = M_3$
$(f_1, f_2, f_3, f_4, C_4) = M_4$
$(f_1, f_2, f_3, f_4, C_5) = M_5$

A test membership value output $M_i$ can indicate the probability that the entity associated with the feature set ($f_1$, $f_2$, $f_3$, $f_4$) is a member of class $C_i$. In this way, a single machine learning system can perform a multi-class classification in accordance with the disclosed subject matter.

An example test output can include:

(New York Times, Greenberg, financial, quarter, frost, business)=0.87

(New York Times, Greenberg, financial, quarter, frost, entertainment)=0.03

(New York Times, Greenberg, financial, quarter, frost, food)=0.76

(New York Times, Greenberg, financial, quarter, frost, weather)=0.83

(New York Times, Greenberg, financial, quarter, frost, sports)=0.09

(New York Times, Greenberg, financial, quarter, frost, technology)=0.11

Each of the above test outputs can indicate an estimated likelihood that the test features in the input indicate membership in the class label that is also included in the input. For example, (New York Times, Greenberg, financial, quarter, frost, business)=0.87 can indicate an 87% likelihood that the article associated with the test features (New York Times, Greenberg, financial, quarter, frost) belongs to the class (relates to the topic), "business." Likewise, (New York Times, Greenberg, financial, quarter, frost, entertainment)=0.03 can indicate that there is an estimated 3% change that the same article relates to the topic "entertainment."

More generally, tests can be composed to obtain estimations of the likely class membership across any number of classes. A set of test features ($f_1$, $f_2$, ..., $f_m$) can be tested against multiple classes $\{C_i\}_{i=1}^{n}$ by generating test inputs:

$$(f_1, f_2, \ldots, f_m, C_1)$$
$$(f_1, f_2, \ldots, f_m, C_2)$$
$$\vdots$$
$$(f_1, f_2, \ldots, f_m, C_n)$$

The machine learning system can generate as an output a test membership value $M_i$ for each of these test inputs. Test membership value $M_i$ can provide a probabilistic estimate that the entity being tested belongs to class $C_i$:

$$(f_1, f_2, \ldots, f_m, C_1) = M_1$$
$$(f_1, f_2, \ldots, f_m, C_2) = M_2$$
$$\vdots$$
$$(f_1, f_2, \ldots, f_m, C_n) = M_n$$

An implementation can provide an indication of class membership based on a membership threshold T. If a test membership value $M_i$ meets or exceeds threshold T, the implementation can indicate that the entity belongs to class $C_i$. If the test membership value does not meet or exceed threshold T, the implementation can indicate that the entity does not belong to class $C_i$.

For example, an implementation can indicate that test inputs having outputs over 0.75 indicate membership in the class corresponding to the class label in the test input, while outputs less than 0.75 indicate non-membership. If such a threshold were set for the above example, the machine learning system would indicate that entity (news article) corresponding to the feature values (New York Times, Greenberg, financial, quarter, frost) are likely members of the classes (topics) "business", "food" and "weather."

An implementation may indicate likely class memberships based on the K highest output values. For example, the three highest output values (test membership values) may be:

($f_1, f_2, \ldots, f_9, C_{12}$)=0.72
($f_1, f_2, \ldots, f_9, C_7$)=0.61
($f_1, f_2, \ldots, f_9, C_{43}$)=0.55 and the implementation may indicate that the entity is a member of classes $C_{12}$, $C_7$ and $C_{43}$. The implementation may also provide a confidence indicator that can be based on the absolute values of the K highest outputs. For example, an implementation can base a confidence indicator on the average value of the K highest output values, wherein a higher average can indicate a higher confidence that the indicated class membership is accurate. The average can be a weighted average. For example, the highest and lowest of the N highest membership values can be weighted less than the middle of the N highest membership values.

Figure 1:
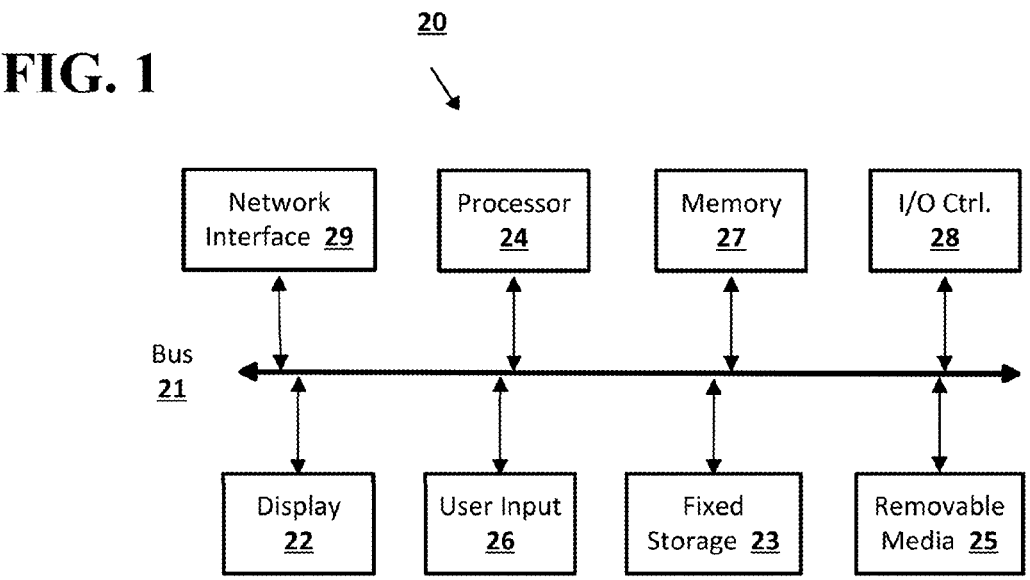
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
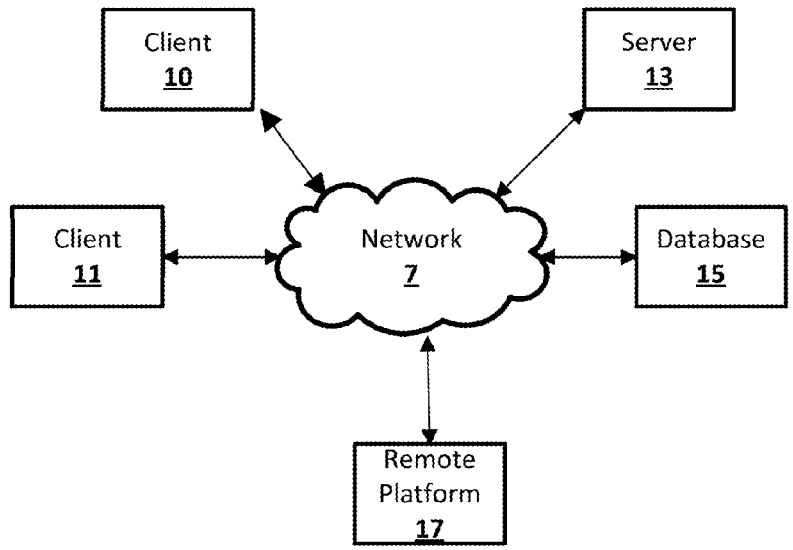
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:

obtaining training data sets that each include (i) data identifying a publisher, an author, and one or more words in a title of a respective article, (ii) for each of multiple topics associated with a predefined set of topics, data identifying the topic, and (iii) for each of the multiple topics associated with the predefined set of topics, data indicating that the respective article either relates or does not relate to the topic;

training, using the training data sets, a predictive model for generating, given (i) data identifying a publisher, an author, and one or more words in a title of a given article and (ii) data identifying a given topic, a likelihood that the given article relates to the given topic;

receiving data identifying a particular article;

obtaining data identifying a publisher, an author, and one or more words in a title of the particular article;

generating, for each of the multiple topics associated with the predefined set of topics, a test data set that includes (i) data identifying the publisher, the author, and the one or more words in the title of the particular article, and (ii) data identifying the topic;

providing, to the predictive model and for each of the multiple topics associated with the predefined set of topics, (i) the data identifying the publisher, the author, and the one or more words in the title of the particular article, and (ii) data identifying the topic;

based on providing, for each of the multiple topics associated with the predefined set of topics, (i) the data identifying the publisher, the author, and the one or more words in the title of the particular article and, (ii) the data identifying the topic, receiving, from the predictive model and for each of the multiple topics associated with the predefined set of topics, a score that reflects a likelihood that the particular article relates to the topic;

selecting a plurality of topics associated with the predefined set of topics based on the scores; and for each topic of the selected plurality of topics associated with the predefined set of topics, designating the particular article as relating to the topic based on the score that reflects the likelihood that the particular article relates to the topic.

2. The method of claim 1, wherein the data indicating that the respective article either relates or does not relate to the respective topics is a binary value.

3. The method of claim 1, wherein designating the particular article comprises:
determining that the score that reflects the likelihood that the particular article relates to the particular topic satisfies a threshold.

4. The method of claim 1, wherein the one or more words in a title include a longest word in the title.

5. The method of claim 1, wherein the one or more words in a title include a second longest word in the title.

6. The method of claim 1, wherein the one or more words in a title include a third longest word in the title.

7. The method of claim 1, wherein the topic is sports, crime, weather, food, entertainment, or business.

8. A system comprising:
one or more computers and one or more storage devices storing instructions that are operable, when executed by the one or more computers, to cause the one or more computers to perform operations comprising:
obtaining training data sets that each include (i) data identifying a publisher, an author, and one or more words in a title of a respective article, (ii) for each of multiple topics associated with a predefined set of topics, data identifying the topic, and (iii) for each of the multiple topics associated with the predefined set of topics, data indicating that the respective article either relates or does not relate to the topic;
training, using the training data sets, a predictive model for generating, given (i) data identifying a publisher, an author, and one or more words in a title of a given article and (ii) data identifying a given topic, a likelihood that the given article relates to the given topic;
receiving data identifying a particular article;
obtaining data identifying a publisher, an author, and one or more words in a title of the particular article;
generating, for each of the multiple topics associated with the predefined set of topics, a test data set that includes (i) data identifying the publisher, the author, and the one or more words in the title of the particular article, and (ii) data identifying the topic;
providing, to the predictive model and for each of the multiple topics associated with the predefined set of topics, (i) the data identifying the publisher, the author, and the one or more words in the title of the particular article, and (ii) data identifying the topic;
based on providing, for each of the multiple topics associated with the predefined set of topics, (i) the data identifying the publisher, the author, and the one or more words in the title of the particular article and, (ii) the data identifying the topic, receiving, from the predictive model and for each of the multiple topics associated with the predefined set of topics, a score that reflects a likelihood that the particular article relates to the topic;
selecting a plurality of topics associated with the predefined set of topics based on the scores; and
for each topic of the selected plurality of topics associated with the predefined set of topics, designating the particular article as relating to the topic based on the score that reflects the likelihood that the particular article relates to the topic.

9. The system of claim 8, wherein the data indicating that the respective article either relates or does not relate to the respective topics is a binary value.

10. The system of claim 8, wherein designating the particular article comprises:
determining that the score that reflects the likelihood that the particular article relates to the particular topic satisfies a threshold.

11. The system of claim 8, wherein the one or more words in a title include a longest word in the title.

12. The system of claim 8, wherein the one or more words in a title include a second longest word in the title.

13. The system of claim 8, wherein the one or more words in a title include a third longest word in the title.

14. The system of claim 8, wherein the topic is sports, crime, weather, food, entertainment, or business.

15. A non-transitory computer-readable medium storing software comprising instructions executable by one or more computers which, upon such execution, cause the one or more computers to perform operations comprising:
obtaining training data sets that each include (i) data identifying a publisher, an author, and one or more words in a title of a respective article, (ii) for each of multiple topics associated with a predefined set of topics, data identifying the topic, and (iii) for each of the multiple topics associated with the predefined set of topics, data indicating that the respective article either relates or does not relate to the respective topic;
training, using the training data sets, a predictive model for generating, given (i) data identifying a publisher, an author, and one or more words in a title of a given article and (ii) data identifying a given topic, a likelihood that the given article relates to the given topic;
receiving data identifying a particular article;
obtaining data identifying a publisher, an author, and one or more words in a title of the particular article;
generating, for each of the multiple topics associated with the predefined set of topics, a test data set that includes (i) data identifying the publisher, the author, and the one or more words in the title of the particular article, and (ii) data identifying the topic;
providing, to the predictive model and for each of the multiple topics associated with the predefined set of topics, (i) the data identifying the publisher, the author, and the one or more words in the title of the particular article, and (ii) data identifying the topic;
based on providing, for each of the multiple topics associated with the predefined set of topics, (i) the data identifying the publisher, the author, and the one or more words in the title of the particular article and, (ii) the data identifying the topic, receiving, from the predictive model and for each of the multiple topics associated with the predefined set of topics, a score that reflects a likelihood that the particular article relates to the topic;
selecting a plurality of topics associated with the predefined set of topics based on the scores; and
for each topic of the selected plurality of topics associated with the predefined set of topics, designating the particular article as relating to the topic based on the score that reflects the likelihood that the particular article relates to the topic.

16. The medium of claim 15, wherein designating the particular article comprises:
determining that the score that reflects the likelihood that the particular article relates to the particular topic satisfies a threshold.

17. The medium of claim 15, wherein the one or more words in a title include a longest word in the title.

18. The medium of claim 15, wherein the one or more words in a title include a second longest word in the title.

19. The medium of claim 15, wherein the one or more words in a title include a third longest word in the title.

20. The medium of claim 15, wherein the topic is sports, crime, weather, food, entertainment, or business.

* * * * *